(12) United States Patent
Salem et al.

(10) Patent No.: US 11,252,576 B2
(45) Date of Patent: Feb. 15, 2022

(54) METHOD AND SYSTEM FOR DYNAMIC OPTIMIZATION OF A TIME-DOMAIN FRAME STRUCTURE

(71) Applicants: Mohamed Salem, Kanata (CA); Amine Maaref, Kanata (CA)

(72) Inventors: Mohamed Salem, Kanata (CA); Amine Maaref, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 16/751,949

(22) Filed: Jan. 24, 2020

(65) Prior Publication Data

US 2020/0162935 A1 May 21, 2020

Related U.S. Application Data

(63) Continuation of application No. 14/568,743, filed on Dec. 12, 2014, now Pat. No. 10,548,019.

(51) Int. Cl.
*H04W 16/14* (2009.01)
*H04W 28/26* (2009.01)
*H04L 27/00* (2006.01)
*H04W 84/12* (2009.01)

(52) U.S. Cl.
CPC .......... *H04W 16/14* (2013.01); *H04W 28/26* (2013.01); *H04L 27/0006* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0135268 A1 | 6/2010 | Seok | |
| 2013/0217400 A1* | 8/2013 | Zhang | H04W 76/27 455/450 |
| 2015/0195849 A1* | 7/2015 | Bashar | H04L 5/0092 370/330 |
| 2015/0201431 A1* | 7/2015 | Um | H04W 72/0446 370/280 |

FOREIGN PATENT DOCUMENTS

| | | |
|---|---|---|
| EP | 2696530 A2 | 2/2014 |
| WO | 2014043665 A2 | 3/2014 |

* cited by examiner

*Primary Examiner* — Robert M Morlan

(57) ABSTRACT

A method at a network element, and a system, for resource allocation in a shared spectrum band. The method is implemented to enable time domain multiplexing between networks in a shared spectrum channel. The method includes determining a co-existence frame size for each of a plurality of successive co-existence frames that are included within a coordination period, and dynamically allocating resources of each co-existence frame for a first network.

20 Claims, 9 Drawing Sheets

METHOD AND SYSTEM FOR DYNAMIC OPTIMIZATION OF A TIME-DOMAIN FRAME STRUCTURE

RELATED APPLICATIONS

The present application is a continuation of U.S. patent application Ser. No. 14/568,743 filed Dec. 12, 2014, now U.S. Pat. No. 10,548,019, issued Jan. 28, 2020, which is incorporated herein by reference.

FIELD OF THE DISCLOSURE

The present disclosure relates to mobile communications and in particular relates to mobile communications utilizing unlicensed spectrum.

BACKGROUND

Wireless data usage has experienced, and continues to experience, significant growth. Some estimates provide for growth in data usage exceeding one thousand times current usage in the near future. Contributing factors to this growth include higher data usage on mobile devices such as smartphones or tablets, as well as the use of data in other emerging areas such as machine-to-machine, device-to-device, or other traffic types.

Currently, significant data is provided by network operators. For example, data may be provided over cellular networks, such as those described by the Third Generation Partnership Project (3GPP) standards. Such mobile technologies include, but are not limited to, Second Generation networks such as the Global System for Mobile Communications (GSM) and Code Division Multiple Access (CDMA), Third Generation networks such as the Universal Mobile Telecommunications System (UMTS), and Fourth Generation networks such as Long Term Evolution (LTE). Also, Fifth Generation (5G) networks are starting to be developed. Utilizing the technologies in these standards, network operators provide a user equipment (UE) with data services.

Wireless data is also provided in other ways, including for example, The Institute of Electrical and Electronic Engineers (IEEE) 802.11 standards for wireless local area networks (WLAN).

However, wireless spectrum is heavily utilized in many situations by network operators and in order to accommodate a significant data increase, various options for 5G communications are being explored.

SUMMARY

According to a first aspect is a method for enabling time domain multiplexing between networks in a shared spectrum channel at a network element. The method includes determining a co-existence frame size for each of a plurality of successive co-existence frames that are included within a coordination period, and dynamically allocating resources of each co-existence frame for a first network.

In some example embodiments, the dynamically allocating resources further comprises: allocating a first network portion of each co-existence frame during which the shared spectrum channel is used exclusively for transmissions by the first network; and allocating a second network portion of each co-existence frame during which the shared spectrum channel is available for transmissions by one or more other networks.

In some example embodiments, the first network has been allocated a respective airtime share of the coordination period for the shared spectrum channel.

In some example embodiments, dynamically allocating resources further comprises: allocating the first network portion based on the respective airtime share of the coordination period allocated to the first network.

In some example embodiments, the resources of each co-existence frame for the first network is dynamically allocated based on quality of service (QoS) requirements for the first network In some example embodiments, the method further comprises: determining the QoS based on delay budget for packets in a transmission queue of the first network.

In some example embodiments, the method further comprises: causing the first network to detect an access category for transmissions in the shared spectrum channel by one or more other networks, wherein the resources of each co-existence frame for the first network is further determined based on QoS requirements for the detected access category.

In some example embodiments, the method further comprises: causing an allocation request for the first network portion to be transmitted in the shared spectrum channel by at least one transmit point of the first network.

In some example embodiments, the allocation request is transmitted by a cluster of transmit points of the first network.

In some example embodiments, the co-existence frame size is determined to allow the first network to perform periodic reference and measurement signals on the shared spectrum channel, wherein the QoS requirements for the first network are based on the periodic reference and measurement signals.

In some example embodiments, the first and second network portions are determined based on an amount of the airtime share of the coordination period allocated to the first network portions of previous co-existence frames in the coordination period such that a sum of the first network portions over the coordination period approximates the airtime share.

In some example embodiments, an air interface technology used by the first network for transmission during the first network portion in the shared spectrum channel is different than an air interface technology used by the one or more other networks.

In some example embodiments, the air interface technology of the one or more other networks corresponds to a wireless local area network (WLAN) protocol.

According to a second aspect is a network element for enabling time domain multiplexing between networks in a shared spectrum channel. The network element comprises: a memory storing instructions; one or more processors coupled to the memory and configured to execute the instructions to: determine a co-existence frame size for each of a plurality of successive co-existence frames that are included within a coordination period; and dynamically allocate resources of each co-existence frame for a first network.

In some example embodiments, the one or more processors are further configured to execute the instructions to: allocate a first network portion of each co-existence frame during which the shared spectrum channel is used exclusively for transmissions by the first network; and allocate a second network portion of each co-existence frame during which the shared spectrum channel is available for transmissions by one or more other networks.

In some example embodiments, the first network has been allocated a respective airtime share of the coordination period for the shared spectrum channel.

In some example embodiments, the one or more processors are further configured to execute the instructions to: allocate the first network portion based on the respective airtime share of the coordination period allocated to the first network.

In some example embodiments, the one or more processors are further configured to execute the instructions to: dynamically allocate resources of each co-existence frame for the first network based on quality of service (QoS) requirements for the first network.

In some example embodiments, the one or more processors are further configured to execute the instructions to: determine the QoS based on delay budget for packets in a transmission queue of the first network.

In some example embodiments, the one or more processors are further configured to execute the instructions to: cause the first network to detect an access category for transmissions in the shared spectrum channel by one or more other networks, wherein the resources of each co-existence frame for the first network is further determined based on QoS requirements for the detected access category.

In some example embodiments, the one or more processors are further configured to execute the instructions to: cause an allocation request for the first network portion to be transmitted in the shared spectrum channel by at least one transmit point of the first network.

In some example embodiments, the first and second network portions are determined based on an amount of the airtime share of the coordination period allocated to the first network portions of previous co-existence frames in the coordination period such that a sum of the first network portions over the coordination period approximates the airtime share.

BRIEF DESCRIPTION OF THE DRAWINGS

The present disclosure will be better understood with reference to the drawings, in which.

DETAILED DESCRIPTION OF THE DRAWINGS

Figure 1:
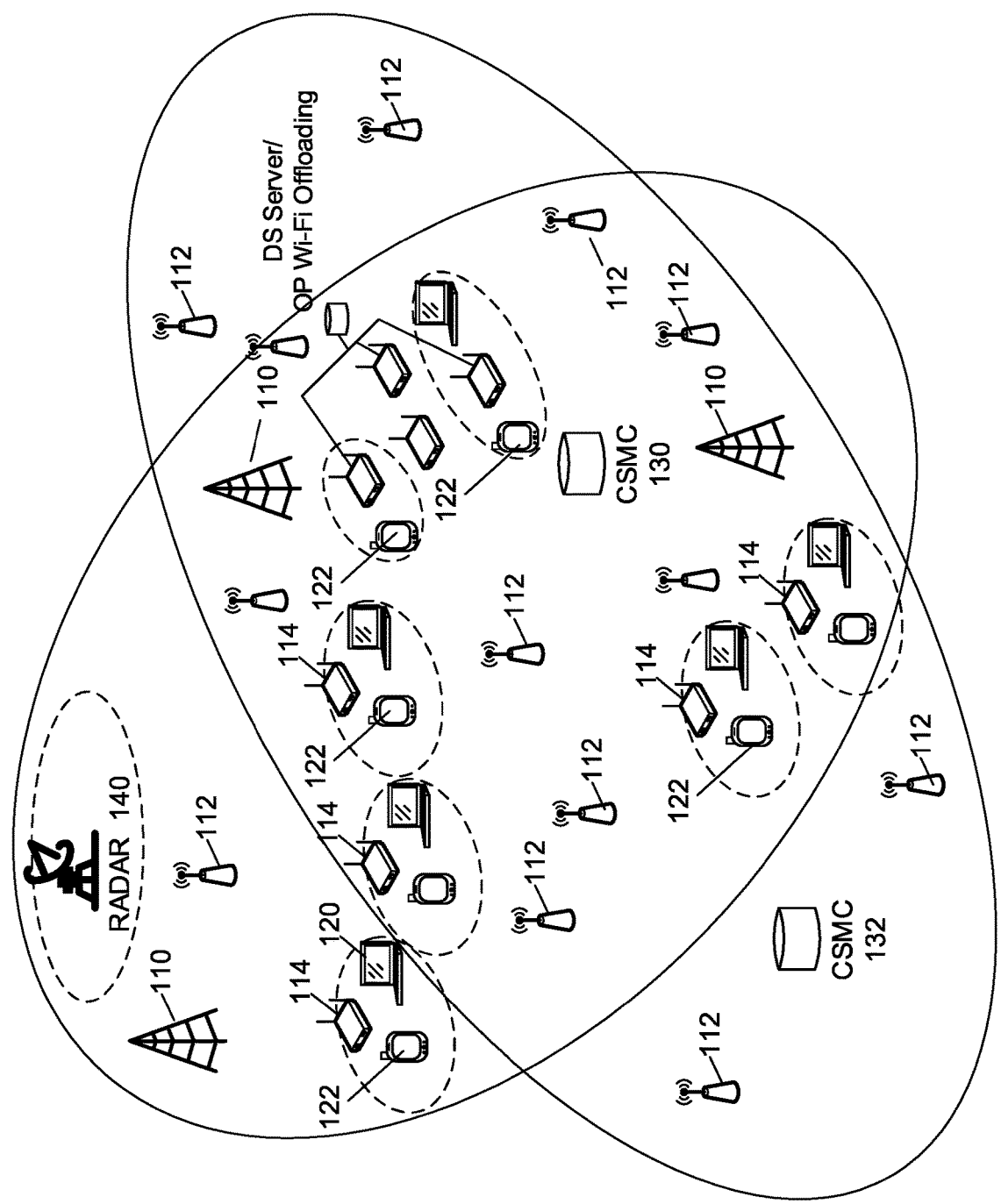
FIG. 1 is a block diagram showing one example network architecture.

Embodiments of the present disclosure provide for methods and systems to exploit unlicensed spectrum in order to ease the burden on licensed spectrum. In one aspect of the present disclosure, the use of the unlicensed spectrum also achieves target Quality of Service (QoS) and Quality of Experience (QoE) for different application scenarios and traffic types.

In one aspect of the present disclosure, Medium Access Control (MAC) mechanisms are provided for time-frequency joint co-existence with present occupants of unlicensed spectrum. Such present occupants may include, for example, but are not be limited to WLAN and radar systems. Specifically, an embodiment of the present disclosure provides a system and method for efficient and flexible quality of service based time-domain coexistence of next-generation carrier-type air interfaces with the existing systems in the unlicensed spectrum.

As used herein, "licensed spectrum" refers to a portion of radio frequency spectrum exclusively granted to a licensee within a geographic area. For example, various regulatory bodies such as the Federal Communications Commission (FCC) and the National Telecommunications & information Administration (NTIA) in the United States may provide a frequency allocation to a licensee for a portion of the radio frequency spectrum in a given band. Such license typically defines frequency ranges, geographic locations, maximum power levels, among other provisions.

"Unlicensed spectrum", as used herein, refers to a frequency band that has been allocated by regulatory agencies, to be available to unregistered users. That is, the unlicensed spectrum is a portion of the radio frequency spectrum without an exclusive licensee. Regulations may limit transmission power over such unlicensed spectrum.

In one aspect, the coexistence is used by clusters of operators' transmit points (TPs), and further allows coexistence with existing legacy and state of the art WLAN systems in the unlicensed spectrum. Specifically, exclusive soft airtime shares may be granted to a radio access cluster (RAC) over one or more frequency channels for a number of frames. Such frames, for example, may coexist in the time domain with other users of the unlicensed spectrum, including WLAN. The term "soft airtime shares", as used herein, indicates an allocation of a flexible proportion of a channel's resources at a given time slot. However, the proportion of the channel utilized by the transmitter may be higher than the allocated amount in a given time slot to meet QoS requirements as long as the access time is then reallocated to others utilizing the channel and future time slots. Also, the proportion of the channel utilized by a transmitter may be lower than the allocated amount. The term "soft" indicates that the allocation is a longer-term target proportion of airtime that may be implemented in a series of optimized physical coexistence frames.

Therefore, given a soft airtime share allocated to a TP cluster on a channel in the unlicensed spectrum within the upcoming time window, an embodiment of the present disclosure provides for dynamically implementing resource reservation in the form of QoS-optimized time-multiplexed transmission slots forming coexistence frames. Optimization may take into account the use of unlicensed spectrum and its suitability for carrier-type air interface, the coexistence efficiency gained by eliminating airtime loss in the form of overhead, quality of service requirements for served flows, as well as quality of service access categories for existing WLANs if applicable.

In one embodiment, the reservation of time-multiplex transmission slots may be done as part of the dynamic functionalities of a central spectrum management controller (CSMC) which usually handles the joint operation in both the licensed and unlicensed spectra.

Reference is now made to FIG. 1, which shows an example of two network operators operating in a geographic location. As seen in FIG. 1, various base stations 110 provide macro cell coverage for user equipments in a coverage area. Base stations 110 belong to a particular operator and in the example of FIG. 1 some of base stations 110 may belong to the first operator while some of the base stations may belong to the second operator.

Further, a plurality of access points 112 are shown in the example of FIG. 1. Such access points may, for example, belong to small cells such as pico or femto cells, as well as remote radio heads (RRHs), among others options. Such small cells may offload some traffic from the macro cells, especially near cell boundaries or in densely used areas.

WLAN access points 114 may be utilized to offload some data traffic to the unlicensed spectrum for a WLAN.

Further, as seen in the embodiment of FIG. 1, user equipments may include devices such as laptops 120, smartphones 122, among others. Such user equipments may access a WLAN through a WLAN access point 114, and may access a cellular network or a future wireless network, such as wireless network which does not have cell-IDs, through a base station 110 or small cell access point 112.

Each network operator may further have a central spectrum management controller (CSMC). Such controller may manage spectrum allocation for transmission points (TPs) within the operator's network. In the example of FIG. 1, a CSMC 130 is operated by a first network operator and a CSMC 132 is operated by a second network operator.

To increase data throughput, one option as seen from FIG. 1, is to offload data traffic to a WLAN. However, such offloading is non-transparent to a user and does not allow for quality of service requirements generally provided by a 3GPP air interface.

In this regard, in one aspect of the present disclosure, the methods and systems port the benefits of the 3GPP air interface (AI) to the unlicensed spectrum.

The use of unlicensed spectrum for mobile communications such as 5G communications (herein referred to as 5G-U for fifth generation unlicensed spectrum usage) may present several challenges. In one embodiment, one challenge is geographically overlapping deployments of networks sharing unlicensed spectrum.

Another challenge for 5G-U is that it is impractical to coordinate operators over a common channel in the licensed spectrum or through a third party such as a brokerage. As described above, licensed spectrum usually means that the spectrum is granted to a certain network operator and may be exclusively for this network operator to use.

Also, any solution for using unlicensed spectrum may require fairness between operators and also fairness to current users of such unlicensed spectrum. For example, if the 5 GHz band is utilized for unlicensed communications, existing users may include WLAN applications, as well as applications such as radar 140 from FIG. 1.

One mechanism for 5G-U usage is to perform listen before talk (LBT). However if individual transmission points (TPs) and UEs simply use listen before talk, the time frequency resources may be unpredictable and quality of service and quality of experience may not be achieved. Further, such mechanisms do not provide for the securing of resources for periodic measurements and synchronization signaling. Also, use of listen before talk usually does not allow for advanced transmission schemes including coordinated multipoint (CoMP) or joint transmission (JT). In a LBT system, the uplink may also be attacked due to the low transmission power.

Another challenge to use unlicensed spectrum is to comply with region specific regulations. For example, in some regions certain unlicensed spectrum may be utilized by anybody, but in other regions such spectrum may be forbidden from being used.

Therefore, in order to achieve a carrier-type air interface over unlicensed spectrum, various systems are described below. The systems below will be described with regard to the 5G operations. However, this is not meant to be limiting and the present disclosure could equally be used with other standards or transmission technologies. The use of 5G-U is therefore only meant to be an example.

Figure 2:
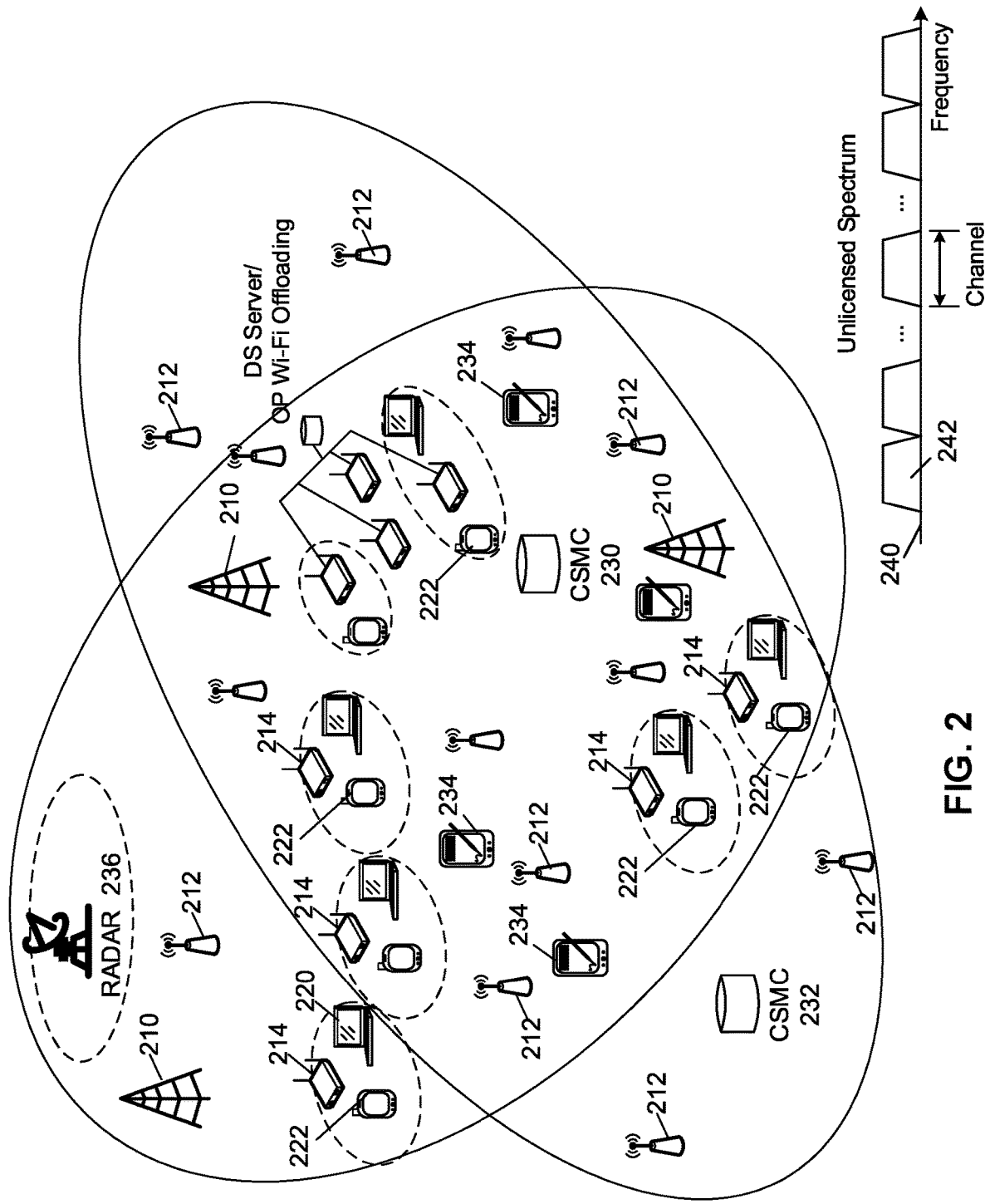
FIG. 2 is a block diagram showing a further example network architecture in which UEs capable of communicating utilizing unlicensed spectrum are added.

Reference is now made to FIG. 2. As seen in FIG. 2, the networks are similar to that of FIG. 1. In particular, a first operator has a first area and a second operator operates within similar geographic areas. Each utilizes base stations 210. Some of base stations 210 belong to the first operator while some of the base stations belong to the second operator.

Small cell access points 212 belong to either the first operator or the second operator. WLAN access points 214 can either belong to households or businesses or may be used by operators to provide for Wi-Fi offloading.

User equipments such as a laptop 220 or smartphone 222 may access either the licensed spectrum of an operator or a WLAN through a WLAN access point 214.

Further, each operator includes a CMSC, shown as CSMC 230 for a first operator and CSMC 232 for a second operator.

Radar 236 may be utilizing a portion of the unlicensed spectrum.

In the example of FIG. 2, UEs 234 are enabled to utilize the unlicensed spectrum for 5G-U communications in accordance with the present disclosure. Specifically, as seen in FIG. 2, a map of unlicensed spectrum 240 provides for a plurality of channels 242 within the unlicensed spectrum. For example channels 242 may each have 20 MHz bandwidth. However, this is merely an example and other bandwidths could be allocated to a channel.

Thus, the present disclosure provides for use of unlicensed spectrum for 5G communications. In one aspect of the present disclosure, a soft airtime grant is provided from each CSMC or virtual spectrum access coordinator (VSAC). The soft airtime shares may then be converted to actual frames utilizing a quality of service based dynamic optimization of coexistence frames on self-allocated channels, as described below.

The present disclosure is not limited to any specific system or method for granting soft airtime shares to a TP or cluster of TPs. Various techniques for such grant are possible. One example of a system which grants soft airtime shares is described below with regard to FIG. 3. However, FIG. 3 is merely provided as an example.

Figure 3:
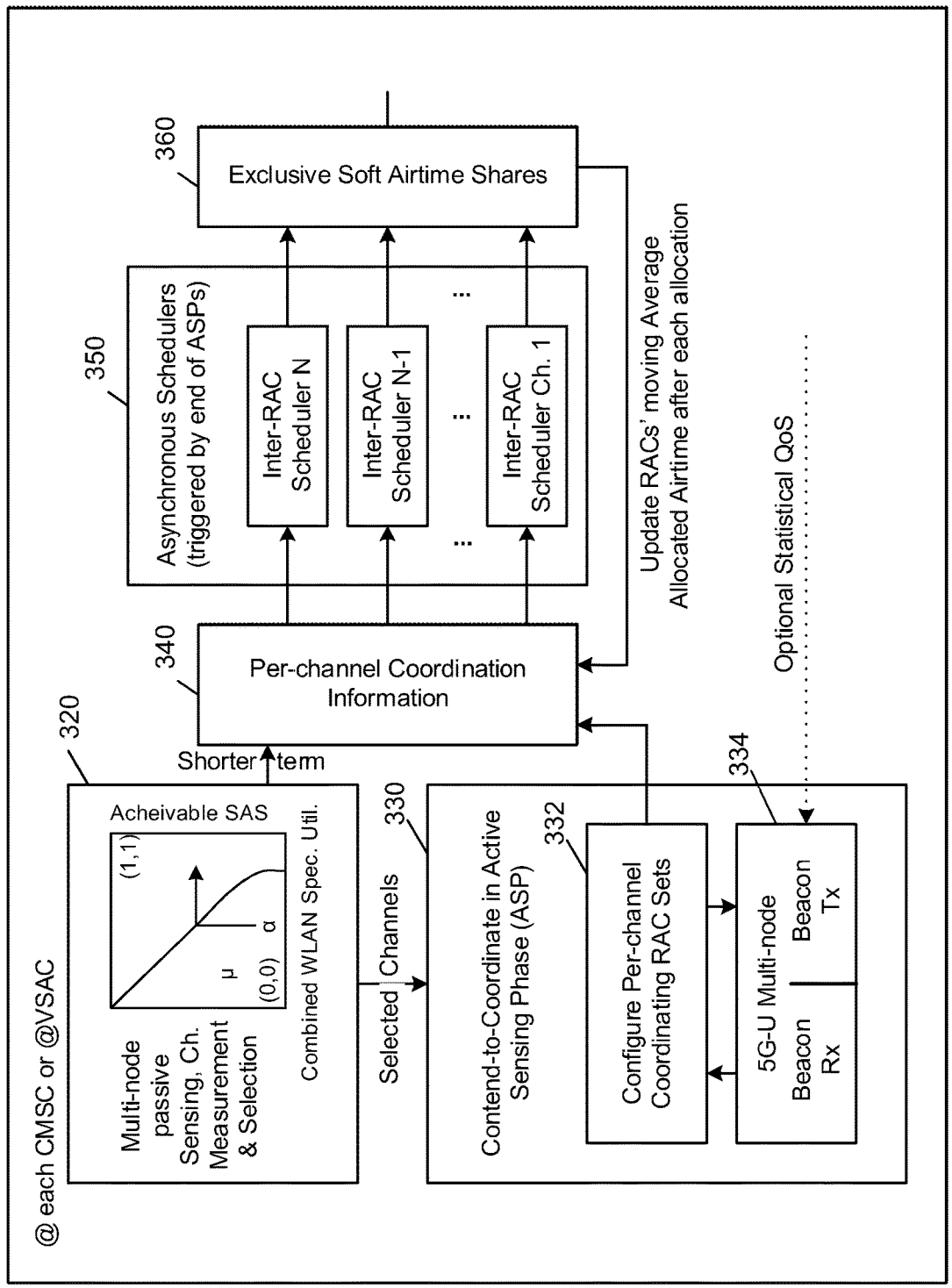
FIG. 3 is a block diagram showing logical blocks in one example of providing airtime shares.

Reference is now made to FIG. 3, which shows a block diagram providing an overview of the grant of soft airtime shares. As seen in FIG. 3, for each central spectrum management controller or virtual spectrum access controller, a plurality of logical blocks are provided.

A first block 320 is a multi-node passive sensing channel measurement and selection block. The multi-node passive sensing may be done by every transmission point (TP) within a geographic area in one embodiment. In other embodiments, the network may configure only a few TPs to do the passive sensing. This may, for example, comprise a group of sensing nodes that perform the sensing.

The passive sensing at block 320 allows the TP to create a list of candidate channels. Once the passive sensing at block 320 is finished, the embodiment of FIG. 3 provides a list of the selected candidate channels discovered during the passive sensing to a block 330.

Block 330 performs various functionality including performing an active sensing phase and creating a per-channel RAC set. Such functionality may, for example, be performed at the CSMC or VSAC. Specifically, at sub-block 332, each CMSC or virtual spectrum access coordinator (VSAC) configures coordinating RAC sets for each channel. Further, at sub-block 334, the active sensing phase includes the reception and transmission of beacons. Overall, the operation of block 330 provides a way of creating RACs and then discovering who the neighbors are for each RAC within a network.

Information from the passive sensing block 320 as well as the configured per channel coordinating RAC sets from sub-block 332 are provided to a per channel coordination information block 340.

Block 340 represents the input information provided to scheduling block 350, which runs schedulers for each channel. Information from the schedulers consists of exclusive soft airtime grants, which are represented by block 360 which is a logical block showing the outcome of the scheduling block allocating the soft airtime shares for each channel.

The soft airtime shares may then be used to provide a 5G air interface over the unlicensed spectrum while ensuring quality of service parameters.

Figure 4:
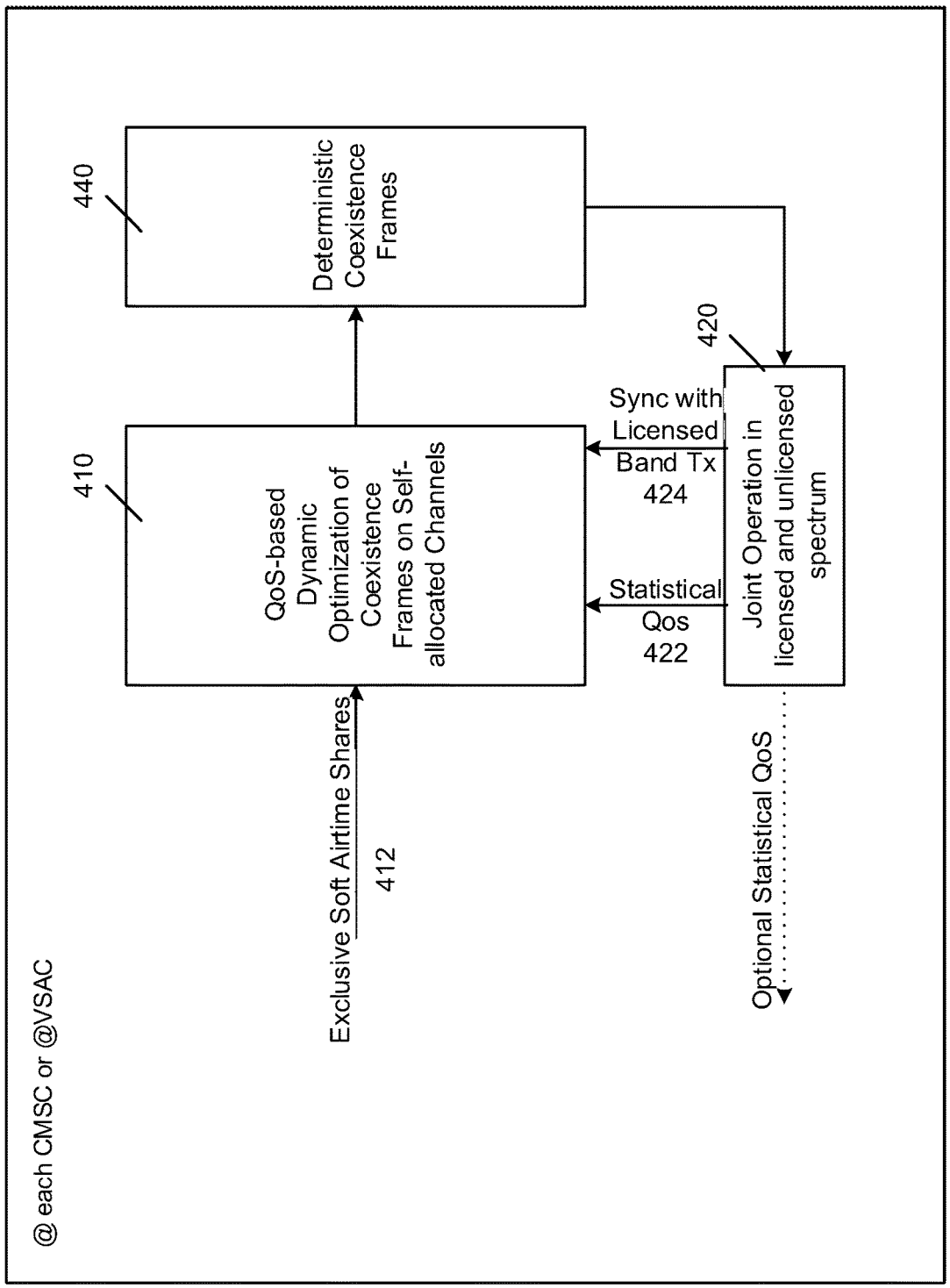
FIG. 4 is a block diagram showing logical blocks for optimization of coexistence frames and assigning of the optimized coexistence frames in accordance with an embodiment of the invention.

Therefore, FIG. 3 provides one option for allocating soft airtime shares on a channel. In accordance with present disclosure, each soft airtime share is then converted into a frame utilizing a system and method for efficient and flexible quality of service based time-domain coexistence of next generation carrier type air interface. In particular, the present disclosure dynamically implements resource reservation of the soft airtime share in the form of QoS-optimized time-multiplexed transmission slots forming coexistence frames. Reference is now made to FIG. 4.

As seen in FIG. 4, a QoS-based dynamic optimization of coexistence frames block 410 provides for the dynamic optimization of frames on self-allocated channels. Specifically, block 410 provides for flexible quality of service based time domain coexistence. By flexible, the frame structure of the 5G-U allocation is not static. Further, the quality of service optimization provides that the airtime is used more efficiently. In one embodiment in order to accomplish this, it is assumed that the receivers, including TPs, within an RAC have the ability to listen to WLAN beacons.

Block 410, includes, as an input, the soft airtime share that has been allocated to a particular RAC by a CMSC or a VSAC, shown by input 412.

Further, a joint operation block 420 provides for the joint operation in both the licensed and unlicensed spectrums.

Such joint operations block 420 provides the optimization block 410 with statistical quality of service information, shown by arrow 422, as well as information about synchronization with the licensed band transmissions, shown by block 424.

Based on the inputs, dynamic optimization block 410 calculates the deterministic physical frame allocations which are represented by the deterministic coexistence frame block 440.

Each of the blocks are described in more detail below.

Figure 5:
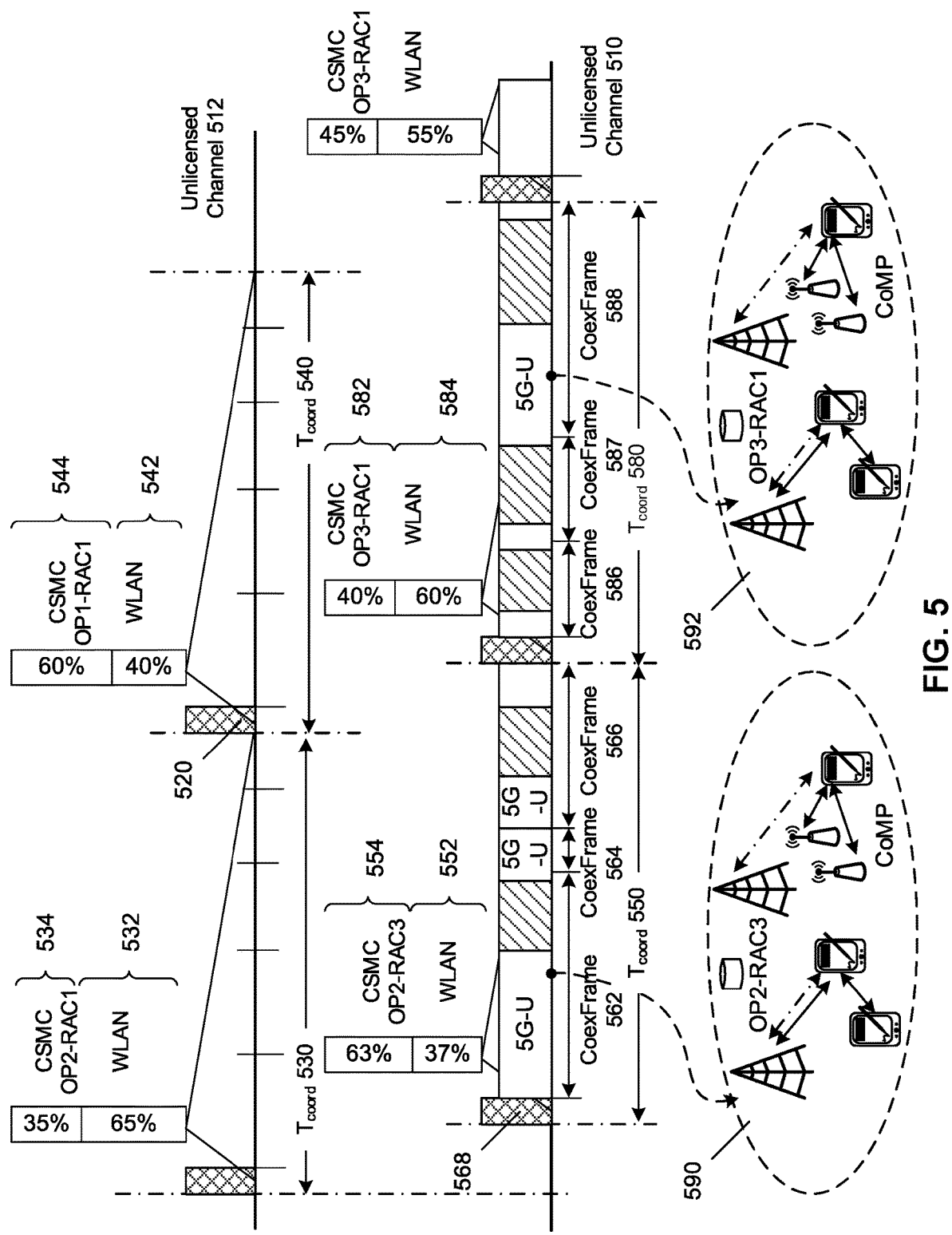
FIG. 5 is a block diagram showing the assignment of coexistence frames on the unlicensed channel in accordance with an embodiment of the invention.

Reference is now made to FIG. 5, which shows an example of a plurality of channels and the grant of both soft airtime shares, as well as the optimized coexistence frames within those airtime shares. In particular, as seen in FIG. 5, a first unlicensed channel 510 is shown along with a second unlicensed channel 512. The example of FIG. 5 is used as an illustration only and in real world embodiments, a plurality of unlicensed channels would exist in the unlicensed spectrum.

As seen in FIG. 5, the unlicensed channel 512 is allocated to an operator's RAC in the form of exclusive soft airtime share. The exclusive soft airtime share span a coordination period that includes both an active sensing phase 520, along with a remainder of the coordination period for allocation of one or more of coexistence frames.

In any given coordination period 530, the soft airtime provides a proportion of the airtime to the existing users of the unlicensed spectrum, such as WLAN. It also provides airtime to one of various RACs. In the example of FIG. 5, in a first coordination time period, the WLAN receives an allocation of 65% of the airframe, shown by block 532. The RAC then receives the remaining 35% allocation shown by block 534.

Similarly, in a second coordination time period 540, the WLAN receives 40% of the allocation, shown by block 542. A different RAC than in the first time slot receives an allocation of 60% of the airtime, shown by block 544.

In FIG. 5, the example of channel 512 does not provide for the actual allocation of the coexistence frames. However, based on optimization block 410 above, the coexistence frames may be allocated. Such allocation is shown with regard to channel 510 in the embodiment of FIG. 5.

In particular, in the embodiment of FIG. 5 a coordination time frame 550 is provided with a soft airtime allocation which includes 37% for a WLAN as shown by block 552 and 63% for the RAC as shown by block 554.

The allocation is then optimized to create actual frames. These are shown, for example, by frames 562, 564, and 566. Further, coordination period 550 includes an active sensing phase block 568 within the coordination period. In one embodiment, as shown in FIG. 5, coexistence frame 564 only includes resources from the 5G network. As an alternative embodiment, a coexistence frame may only include resource from a WLAN network.

The optimization of frame allocation by block 410 of FIG. 4 above allows for flexibility in terms of the coexistence frames. Thus, the frame allocation is not restricted to a fixed carrier frame size. Nor is the assigned frame restricted to a WLANs beacon interval, also known as target beacon transmission time (TBTT). By allowing for flexible frame size, airtime may be optimized. Specifically, no loss of airtime or coexistence overhead is incurred since the flexible timing allows for the controller to seize unused airtime.

Further, optimization takes into account the delay budget of packets in a queue for the 5G air interface. It also considers the maximum duration for measurement, synchronization and control for 5G-U packets. Further, the optimization considers the WLAN's enhanced distributed channel access (EDCA) requirements for successful transmission.

As described below, before any coexistence frame and time, a transmit point listens and grabs a channel before the WLAN. It then reserves the optimized portion of the following coexistence frames using a multi-node transmission of a fake WLAN clear to send (CTS) signal. If an RAC has multiple TPs, such transmission of the CTS signal may either be joint between TPs within an RAC or it may be sequential, depending on the system design.

Referring again to FIG. 5, in a second time frame 580 the WLAN is allocated 60% of the airframe, shown by block 582 and the RAC is allocated 40% of the airframe, as shown by block 584. In this case, various frames are allocated, wherein the frames are optimized for use in the coordination time period 580, such optimized frames are shown with references 586, 587 and 588.

The frames in the unlicensed spectrum used for the 5G airframe can then utilize similar techniques as those used for the licensed spectrum for 5G. In particular, as shown in FIG. 5, during the optimized airframe, techniques such as coordinated multipoint (CoMP) transmission of data may be provided to a UE, while control signaling is provided from a macro base station, shown by block 590. Block 590 further provides for other optimization of transmission and spectrum utilization, including device to device (D2D) communications on the unlicensed spectrum.

Similarly, block 592 shows the usage by a different operator and RAC of similar techniques.

Based on the above, the optimization at block 410 has various functionalities. In a first aspect, the optimization maximizes the length of the upcoming coexistence frames while taking into account various considerations. A first consideration is the timing requirements for control measurements and synchronization of the operators air interface. Thus, in accordance with the first consideration, adequate timing needs to be allocated to ensure that periodic carrier-type control, measurement and synchronization signaling may be done effectively.

A second consideration for maximizing the length of the flexible coexistence frame is the current quality of service requirements of operator packets that are in queues. In other words, packet delay budgets are taken into account with regard to the length of upcoming coexistence frames.

A third consideration may include factoring the most stringent WLAN QoS requirements by detecting access categories (ACs) being served in the vicinity. Such consideration is only relevant for state of the art WLANs, such as 802.11e or 802.11ac WLANs. In other cases, default values may be used for WLAN QoS requirements.

A fourth consideration for maximizing the length is equalizing the WLANs fraction of airtime for upcoming coexistence frames based on the actual airtime within the elapsed frames in order to maintain an overall ratio of operator to WLAN airtime shares. In other words, if, due to quality of service requirements, a higher proportion than allocated was used by the RAC in a previous coexistence frame, then a subsequent coexistence frame may compensate for the overuse by assigning more resources to the WLAN.

In order to seize the airtime resources, in one aspect of the present disclosure, an RAC may send a multi-node transmission of fake WLAN CTS/Request to Send (RTS) frames to effectively clear the medium from surrounding WLAN transmissions. If the RAC includes multiple TPs, such multi-node transmissions may either be joint, wherein all of the TPs within the RAC send the fake WLANs CTS/RTS jointly, or may be sequential. If only one TP exists within the RAC, the WLAN CTS/RTS is sent from the TP to clear the medium. The fake WLAN CTS/RTS frames protect the optimized duration of the cluster's upcoming time slot by setting the network allocation vectors (NAVs) for the WLAN to force the deferral of contention. The NAVs will preclude, for the time period set in the vector, the WLAN from contending for the channel resources.

In a further aspect, the medium may be acquired close to the end of the coexistence frame after the WLAN has finished transmitting. In this case, the remaining time period within that WLAN transmission slot may be insufficient for another successful WLAN transmission. In this case, the time may be granted to a 5G-U air interface. In other words, if the WLAN transmission is close to the end of its frame and there is insufficient resources for another WLAN to transmit then the RAC may opportunistically seize the resources of the channel utilizing the fake WLAN CTS/RTS.

In a further aspect of the present disclosure, symbol level synchronization of the transmissions within the optimized slots in the unlicensed band conforms with existing signals on the licensed band. This may be based on a signal from a joint operation manager within the operator's network to align the physical symbols in both bands, allowing for a unified air interface.

Figure 6:
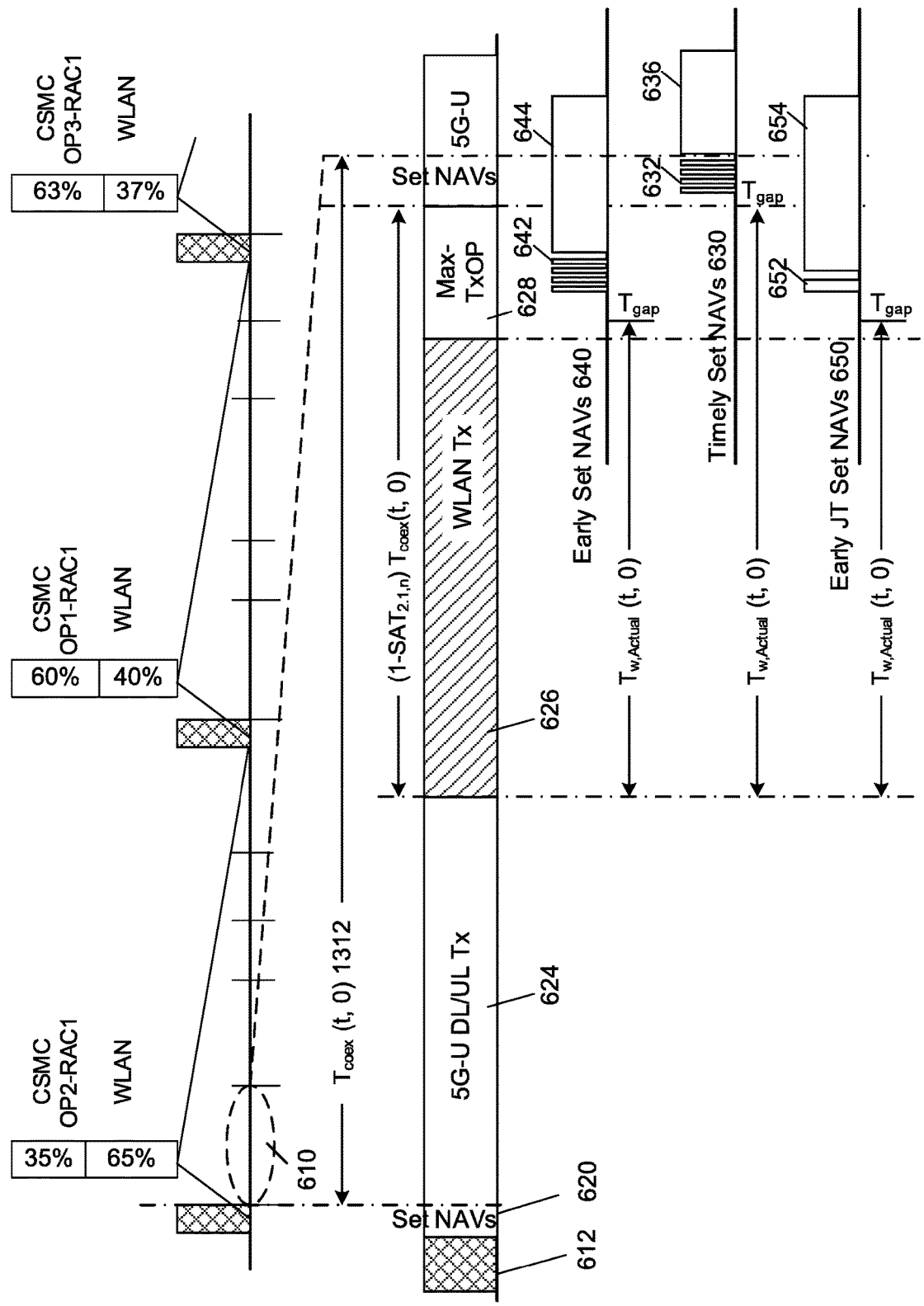
FIG. 6 is a block diagram showing options for sending NAVs at the end of a coexistence frame in accordance with an embodiment of the invention.

Reference is now made to FIG. 6, which shows transmission blocks within a co-existence period. As seen in FIG. 6, a coexistence frame 610 forms part of a coordination period. In the example of FIG. 6, the coordination period dynamically allocates, through soft airtime shares, the WLAN to have 65% of the resources while a first RAC has 35% of the resources during the coordination period.

After the active sensing phase 612, the 5G-U channel is seized through the issuance of the CTS/RTS with the NAVs set for a particular duration. This is shown by block 620.

After the transmission at block 620, the 5G-U has the channel for the duration set within the NAVs. Therefore, in block 624 the 5G-U may perform downlink and uplink transmissions in a similar manner to the air interface of the licensed 5G spectrum. The time within block 624 may be utilized, for example, to offload data from the licensed spectrum to the unlicensed spectrum and to utilize the air interface to optimize such data transfer.

At the end of block 624, the WLAN is granted access to the channel, as shown by block 626. The actual granted time is defined by the formula $(1-SAT_{2.1,n}) T_{coex}(t,0)$, where $SAT_{2.1,n}$ is the granted soft airtime percentage for 5G-U communications, and is realized after the coexistence frame elapses.

Prior to the expiration of the coexistence frame, the network element again takes control of the channel through the issuance of the CTS/RTS with the NAVs set for a particular duration. If, as shown by block 626, the transmission ends prior to the maximum transmission opportunity then a time period, shown by block 628, remains for the WLAN allocation. In one embodiment, shown by reference 630, the RAC may wait until the end of maximum transmission opportunity prior to sending the NAVs. Thus, the NAVs are sent as shown by blocks 632.

After sending the NAVs, then a further time slot, shown by block 636 may be used for 5G-U transmissions.

Alternatively, as shown by reference 640, the NAVs may be sent early. This would happen if, for example, the WLAN transmission continued through the maximum transmission opportunity and hence the remaining time at block 628 was not long enough to have another complete WLAN transmission. In this case, as shown by reference 640, the NAVs are sent early, shown by blocks 642, and then the 5G-U transmission utilizes the channel, as shown by block 644.

In a further alternative embodiment, shown by reference 650 the NAVs may be sent jointly. Thus, the NAV transmission is shown by block 652. After the NAV transmission, the channel may be utilized for 5G-U transmissions shown by block 654.

In the above, if the NAVs are sent sequentially, then the NAV setting signals are spaced by a time that is less than the point coordination function (PCF) interframe spacings (PIFS).

If the NAVs are sent early, the optimization utilizes the channel more efficiently since the WLAN deficit is captured by the 5G-U transmissions. An attempt to compensate for the WLAN's deficit may be made while optimizing the following CoexFrame.

Figure 7:
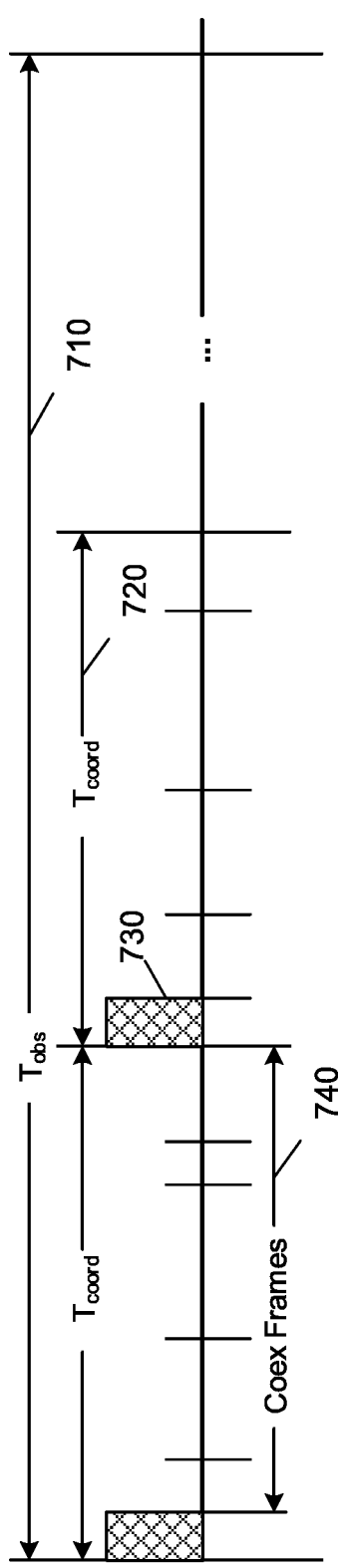
FIG. 7 is a timing diagram showing an observation period, a plurality of coordination frames, an active sensing phase and coexistence frames in accordance with an embodiment of the invention.

Reference is now made to FIG. 7, which shows the breakdown of a soft airtime allocation. FIG. 7 shows the timeline of the observation and coordination time scales, along with the active sensing phases described above. As seen in FIG. 7, both long and short term observation periods are provided. In particular, a long observation period, denoted $T_{obs}$, is utilized for passive observation of the channels to ensure that the soft airtime is allocated appropriately and on appropriate channels. A shorter time scale, denoted as $T_{coord}$ is utilized for the sensing phase as well as the creation of RACs and access to the channel through a soft airtime grant. In FIG. 7, the $T_{obs}$ time period 710 is shown to be much longer than the $T_{coord}$ time period 720.

Further, as seen in FIG. 7, during the $T_{coord}$ time period 720, an active sensing phase 730 and a plurality of coexistence frames 740 exist. The active sensing phase 730 is used by RACs to provide beacons to neighboring RACs, allowing RACs to compile a list of neighbors and attributes of the neighbors. One this procedure is finished, an RAC may be granted access to the coexistence frames in accordance with the soft airtime grant.

Figure 8:
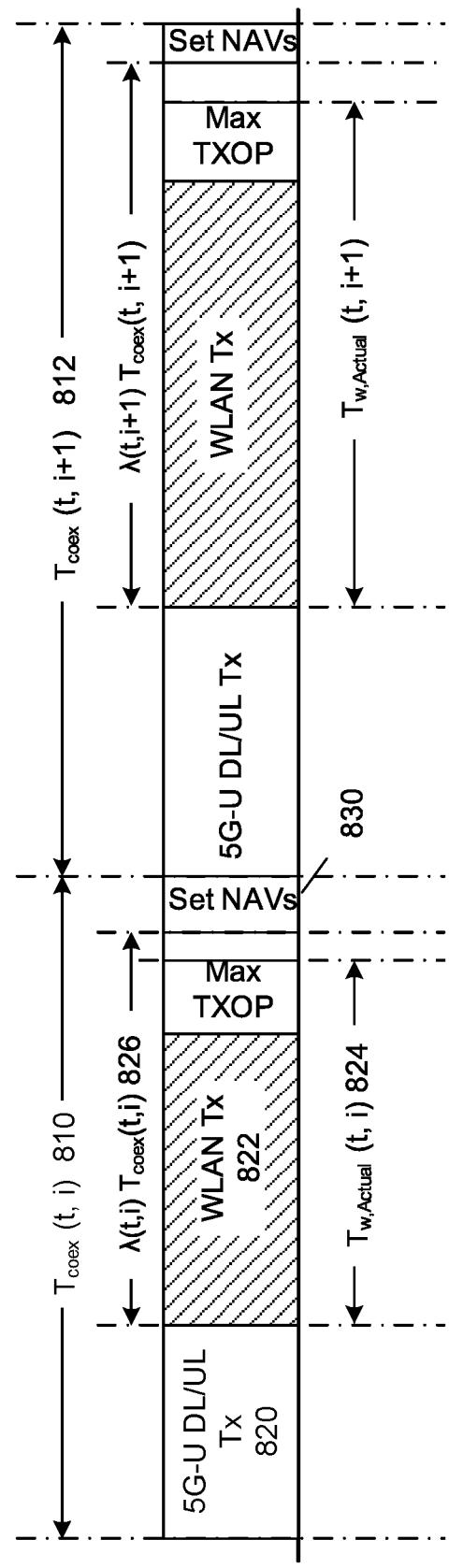
FIG. 8 is a timing diagram showing the assignment of resources during a coexistence frame in a channel in accordance with an embodiment of the invention.

Referring to FIG. 8, the dynamic optimization of the coexistence frames for a quality of service based distribution of the soft airtime share is provided. The example of FIG. 8 is one example showing the allocation of the airtime grant to accommodate both the 5G-U air interface and the quality of service requirements thereof, as well as the WLAN interface and its quality of service requirements.

In the embodiment of FIG. 8, two coexistence frames, namely coexistent frame 810 and coexistent frame 812 are provided. The time periods for the coexistence frames are denoted as $T_{coex}(t,i)$ for coexistence frame 810 and $T_{coex}(t,i+1)$ for coexistence frame 812.

In the example of FIG. 8, each coexistence frame includes both a 5G-U transmission as well as a WLAN transmission. In coexistence frame 810, the 5G-U transmission is shown with reference numeral 820 and the WLAN transmission is shown with reference numeral 822.

Each coordination period consists of the active sensing phase plus the coexistence frames. This may be noted in accordance with equation 1 below.

$$\sum_j T_{Coex}(t, j) = T_{Coord} - T_{ASP} \quad (1)$$

As seen in equation 1 above, the sum of all the coexistence periods is equal to the coordination period minus the period for the active sensing phase.

Within each coordination frame, the portion allocated to the 5G-U transmission is denoted by $SAT_{l,n}(t)$. The target WLAN SAT is therefore denoted by equation 2 below.

$$\lambda(t,0) = 1 - SAT_{l,n}(t) \quad (2)$$

In some cases not all of the actual target WLAN SAT is used by the WLAN. For example, in FIG. 8, the WLAN transmission period 822 is shown to be $T_{w,Actual}(t, i)$, as denoted by reference numeral 824, and is less than the actual soft airtime allocation for the WLAN, as shown by reference numeral 826.

Further, once the transmission time ends, the RAC may send its NAVs as shown by block 830.

One parameter within the optimization algorithm ensures that the amount of time allocated for the WLAN meets minimum thresholds. Specifically, the WLAN transmission in the upcoming coexistence frame must not violate a minimum packet delay budget. This is shown, for example, with regard to equation 3 below, which shows that the length of the coexistence frame multiplied by the allocation to the WLAN, when added to the time for the NAV setting must be less than the minimum packet delay budget, where the value of the WLANs allocation falls between 0 and 1.

$$\lambda(t, i)T_{Coex}(t, i) + T_{setNAVs} < \min_{k \in K_l}\{PDB_{k,l}(t, i)\}, 0 \le \lambda(t, i) \le 1 \quad (3)$$

A further consideration for the optimization is that the interval between 5G-U slots should support reference and measurement signals. This may be shown, for example with regard to equation 4 below.

$$T_{Coex}(t,i) < \tau_{meas\_max}^{5G-U} \quad (4)$$

As seen in equation 4 above, the default coexistence frame size, denoted $T_{Coex}(t, i)$ must be less than the maximum time required for reference and measurement signals.

In a further aspect of the optimization, the WLANs transmission in an upcoming coexistence frame should be sufficient to allow for contention and the longest enhanced distributed channel access (EDCA) transmission opportunity. This is, for example, shown below with regard to equation 5.

$$DIFS + CW_{max} + maxTXOP \le \lambda(t,i)T_{Coex}(t,i), \lambda(t,i) > 0 \quad (5)$$

As seen in equation 5 above, the distributed interframe space (DIFS), plus the maximum contention window $(CW_{max})$ plus the maximum transmission opportunity, should be less than or equal to the proportion of the coexistence frame allocated for the WLAN, where at least a portion of the subframe is allocated for the WLAN, denoted by $\lambda(t, i)$, is greater than 0.

A further consideration for the optimization is to compensate the WLAN in situations where the 5G-U has taken more airtime than allocated for quality of service reasons. Such equalization, for example, may be shown with regard to equation 6 below.

$$\lambda(t, i+1)T_{Coex}(t, i+1) + \sum_{j=0}^{i} T_{w,Actual}(t, j) = \lambda(t, 0)\left[T_{Coex}(t, i+1) + \sum_{j=0}^{i} T_{Coex}(t, j)\right] \quad (6)$$

As seen in equation 6, the percentage of the channel allocated in a coexistence frame number i+1, plus the sum of actual allocations for the WLAN in past subframes, should equal the target WLAN SAT times the sum of the next coexistence time frame and the sum of the past coexistence frames.

In a further optimization parameter, dead airspace that would be useless to the WLAN because the time period left is too short for the WLAN can be used for the 5G-U transmission. Alternatively, the whole time frame may be given to the WLAN if the target SAT has been violated due to the 5G-Us quality of service requirements. This is shown by equation 7 below.

$$\lambda(t, i+1) = \begin{cases} 0, & T_{Coord\_end} < DIFS + CW_{max} + maxTXOP \\ 1, & \sum_{j=0}^{i} T_{w,Actual}(t, j)/(T_{Coord} - T_{ASP} - T_{Coord_{end}}) \ll \lambda(t, 0) \end{cases} \quad (7)$$

As seen in equation 7 above, the proportion of the next subframe for the WLAN is 0 if the time for the coordination is less than a threshold time, and is 1 if the actual use of the WLAN is much less than the proportion allocated by the soft airframe grant.

Figure 9:
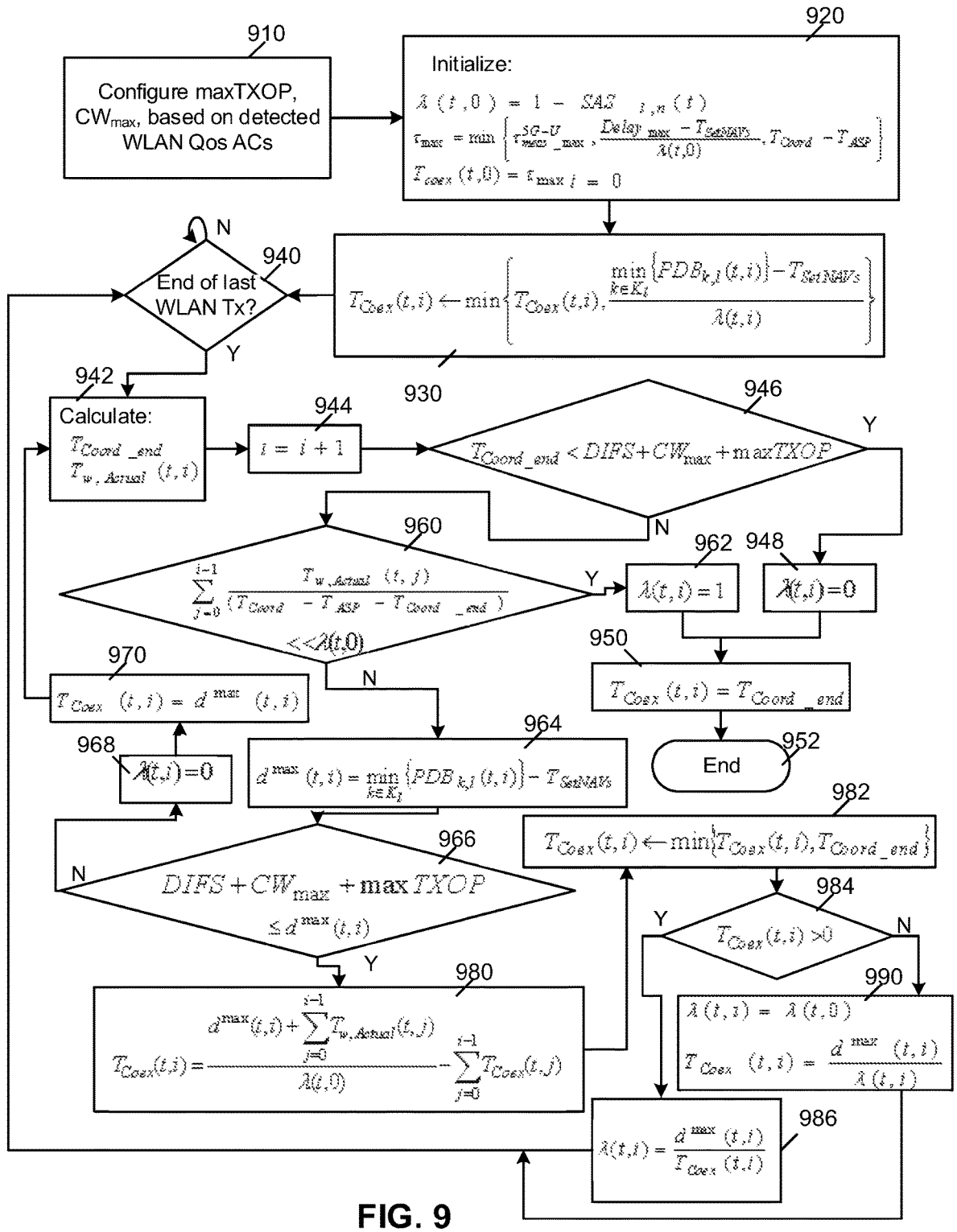
FIG. 9 is a block diagram showing a process for optimizing resources for coexistence frames in accordance with an embodiment of the invention.

The above may be summarized in accordance with the process diagram of FIG. 9. Referring to FIG. 9, the example process starts at block 910 in which the maximum transmission opportunity, the contention window, and potentially other factors are configured based on the detected WLAN quality of service ACs. The process then proceeds to block 920 in which various initializations are performed. In a first initialization, the WLAN SAT is set. Further the maximum coexistence frame size is set, along with the default coexistence size.

From block 920 the process proceeds to block 930 in which the next coexistence frame size is set to be the minimum of the coexistence frame size and the smallest packet delay budget minus the time for the setting of the NAVs divided the SAT of the WLAN.

Once the coexistence frame size has been set in block 930, the process proceeds to block 940 in which a check is made to determine whether the end of the last WLAN transmission has occurred. If not, the process proceeds to loop to block 940 until the end of the WLAN transmission is found. At this point, the process proceeds to block 942 in which the end of the coordination period is calculated, as well as the actual transmission time used for WLAN.

The process then proceeds to block 944 in which the counter is incremented for the coexistent frame and the process then proceeds to block 946 in which a check is made to determine whether or not the end of the coordination period is less than the DIFS+CW$_{max}$ plus the maximum transmission opportunity. This determines whether the time period remaining is too little to make further WLAN transmissions.

If the time is too short then the process proceeds from block 946 to 948. At block 948, the allocation to the WLAN is set to 0 and the process then proceeds to block 950 in which the coexistence frame time period is set to the end of the coordination period and the process then proceeds to block 952 and ends.

From block 946, if there is sufficient time for the WLAN then the process proceeds to block 960 in which a check to determine whether or not the actual allocation to the WLAN is much less than the granted allocation. If yes, then the process proceeds to block 962 in which the WLAN is granted the entire next coordination frame. From block 962 the process proceeds to block 950 which ends the coexistence frame and the process then proceeds to block 952 and ends.

From block 960, if the allocation is not much less than the granted allocation then the process proceeds to block 964 in which a minimum time required for the WLAN transmission is set and the process then proceeds to block 966. At block 966, a check is made to determine the DIFS+CW$_{max}$ plus the maximum transmission opportunity is less than the minimum transmission requirement. If no, then the process proceeds to block 968 in which the WLAN SAT is set to zero, and the process then proceeds to block 970.

At block 970 the size of the coexistence time frame is set to the remaining time period and the process then proceeds back to block 942.

From block 966, if there is sufficient time to allocate time to the WLAN then process proceeds to block 980 in which the coexistence frame period is calculated. At block 982 the coexistence time period is set to the minimum of the coexistence time period calculated at block 980 and the time until the end of the coordination period.

The process then proceeds to block 984 in which a check is made to determine whether or not the time allocated is greater than 0. If yes, then the proportion of the frame allocated to the WLAN is set at block 986 and the process proceeds back to block 940.

Conversely, if the coexistence period is not greater than 0 then from block 984 the process proceeds to block 990 in which the SAT for the next time period for the WLAN is set to the default SAT value and the coexistence frame time for the next time frame is set to be the remainder. From block 990 the process proceeds back to block 940 and ends.

The above therefore provides for time domain coexistence of clusters of TPs rather than for individual base stations.

The above further provides for a flexible, rather than a static, superframe, size. This eliminates airtime overhead and it provides the flexibility to meet quality of service requirements.

In order to seize the channel, geographically spread fake WLAN frames may be transmitted through multi-node transmission in a coexisting cluster. Such transmissions may either be joint or sequential in time, and provide effective protection from WLAN transmissions, especially for the uplink where power levels may not be detected by the WLAN.

The above further provides for optimization of length of the upcoming flexible coexistence frames. In particular, considering the maximum timing requirements for control, measurements, and synchronization of the operator air interface is done. Further, a consideration of the current quality of service requirements for operator packets in queues is made to ensure packet delay budgets are met.

By optimizing the length of the upcoming coexistence frame, the most stringent WLAN QoS service requirements may be met by ensuring that the access categories are detected and are being served in the vicinity for WLANs that support such access categories.

Further, equalization of a WLAN's fraction of airtime in the upcoming coexistence frame based on the actual airtime within the elapsed frames maintains an overall ratio of operator to WLAN airtime shares, thus ensuring the fairness of the 5G-U transmissions.

In a further aspect, the optimization allows for enabling unified carrier type air interfaces by symbol level synchronization with transmissions in the licensed bands.

Figure 10:
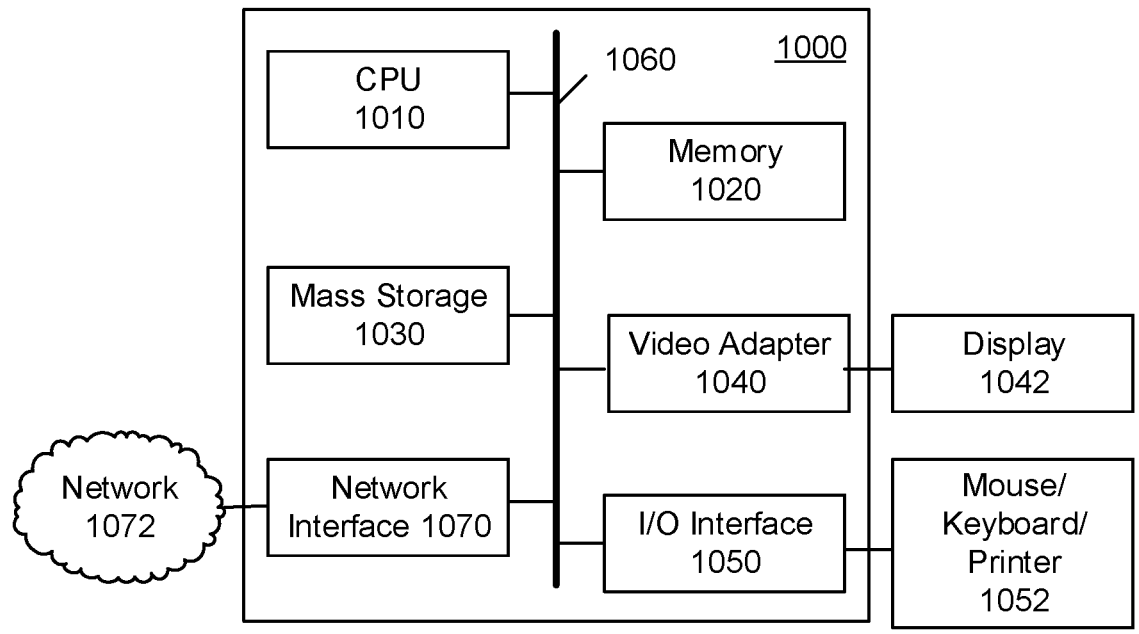
FIG. 10 is a block diagram illustrating a computing platform in accordance with an embodiment of the invention.

The above functionality may be implemented on any one or combination of network elements. FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit equipped with one or more input/output devices, such as a speaker, microphone, mouse, touchscreen, keypad, keyboard, printer, display, and the like. The processing unit may include a central processing unit (CPU) 1010, memory 1020, a mass storage device 1030, a video adapter 1040, and an I/O interface 1050 connected to a bus 1060.

The bus 1060 may be one or more of any type of several bus architectures including a memory bus or memory controller, a peripheral bus, video bus, or the like. The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1050 provide interfaces to couple external input and output devices to the processing unit. As illustrated, examples of input and output devices include the display 1042 coupled to the video adapter and the mouse/keyboard/printer 1052 coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit 1000 also includes one or more network interfaces 1070, which may comprise wired links, such as an Ethernet cable or the like, and/or wireless links to access nodes or different networks. The network interface 1070 allows the processing unit to communicate with remote units via the networks. For example, the network interface 1070 may provide wireless communication via one or more transmitters/transmit antennas and one or more receivers/receive antennas. In an embodiment, the processing unit 1000 is coupled to a local-area network or a wide-area network, shown as network 1072, for data processing and communications with remote devices, such as other processing units, the Internet, remote storage facilities, or the like.

Figure 11:
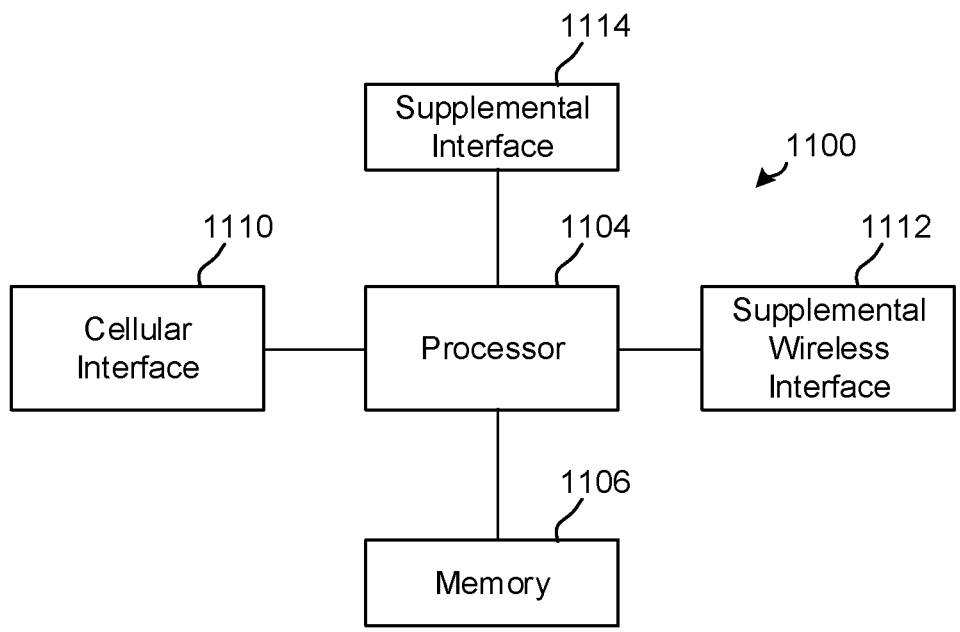
FIG. 11 illustrates a block diagram of an embodiment communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, a cellular interface 1110, a supplemental wireless interface 1112, and a supplemental interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The cellular interface 1110 may be any component or collection of components that allows the communications device 1100 to communicate using a cellular signal, and may be used to receive and/or transmit information over a cellular connection of a cellular network. The supplemental wireless interface 1112 may be any component or collection of components that allows the communications device 1100 to communicate via a non-cellular wireless protocol, such as a Wi-Fi or Bluetooth protocol, or a control protocol. The device 1100 may use the cellular interface 1110 and/or the supplemental wireless interface 1112 to communicate with any wirelessly enabled component, e.g., a base station, relay, mobile device, etc. The supplemental interface 1114 may be any component or collection of components that allows the communications device 1100 to communicate via a supplemental protocol, including wire-line protocols. In embodiments, the supplemental interface 1114 may allow the device 1100 to communicate with another component, such as a backhaul network component.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method for enabling time domain multiplexing between networks in a shared spectrum channel, the method comprising, at a network element:
   determining a co-existence frame size for each of a plurality of successive co-existence frames that are included within a coordination period; and
   dynamically allocating resources of each co-existence frame for a first network.

2. The method of claim 1 wherein dynamically allocating resources further comprises:
   allocating a first network portion of each co-existence frame during which the shared spectrum channel is used exclusively for transmissions by the first network; and
   allocating a second network portion of each co-existence frame during which the shared spectrum channel is available for transmissions by one or more other networks.

3. The method of claim 2 wherein the first network has been allocated a respective airtime share of the coordination period for the shared spectrum channel.

4. The method of claim 3 wherein dynamically allocating resources further comprises:
   allocating the first network portion based on the respective airtime share of the coordination period allocated to the first network.

5. The method of claim 1 wherein the resources of each co-existence frame for the first network are dynamically allocated based on quality of service (QoS) requirements for the first network.

6. The method of claim 5 wherein the method further comprises:
   determining the QoS based on delay budget for packets in a transmission queue of the first network.

7. The method of claim 1 the method further comprises: causing the first network to detect an access category for transmissions in the shared spectrum channel by one or more other networks, wherein the resources of each co-existence frame for the first network is further determined based on QoS requirements for the detected access category.

8. The method of claim 2 the method further comprises: causing an allocation request for the first network portion to be transmitted in the shared spectrum channel by at least one transmit point of the first network.

9. The method of claim 8 wherein the allocation request is transmitted by a cluster of transmit points of the first network.

10. The method of claim 5 wherein the co-existence frame size is determined to allow the first network to perform periodic reference and measurement signals on the shared spectrum channel, wherein the QoS requirements for the first network are based on the periodic reference and measurement signals.

11. The method of claim 3 wherein the first and second network portions are determined based on an amount of the airtime share of the coordination period allocated to the first network portions of previous co-existence frames in the coordination period such that a sum of the first network portions over the coordination period approximates the airtime share.

12. The method of claim 2 wherein an air interface technology used by the first network for transmission during the first network portion in the shared spectrum channel is different than an air interface technology used by the one or more other networks.

13. A network element for enabling time domain multiplexing between networks in a shared spectrum channel, comprising:
   a memory storing instructions;
   one or more processors coupled to the memory and configured to execute the instructions to:
      determine a co-existence frame size for each of a plurality of successive co-existence frames that are included within a coordination period; and
      dynamically allocate resources of each co-existence frame for a first network.

14. The network element of claim 13 wherein the one or more processors are further configured to execute the instructions to:
   allocate a first network portion of each co-existence frame during which the shared spectrum channel is used exclusively for transmissions by the first network; and
   allocate a second network portion of each co-existence frame during which the shared spectrum channel is available for transmissions by one or more other networks.

15. The network element of claim 14 wherein the first network has been allocated a respective airtime share of the coordination period for the shared spectrum channel.

16. The network element of claim 15 the one or more processors are further configured to execute the instructions to:
   allocate the first network portion based on the respective airtime share of the coordination period allocated to the first network.

17. The network element of claim 13 the one or more processors are further configured to execute the instructions to:
   dynamically allocate resources of each co-existence frame for the first network based on quality of service (QoS) requirements for the first network.

18. The network element of claim 17 the one or more processors are further configured to execute the instructions to:
   determine the QoS based on delay budget for packets in a transmission queue of the first network.

19. The network element of claim 13 the one or more processors are further configured to execute the instructions to:
   cause the first network to detect an access category for transmissions in the shared spectrum channel by one or more other networks, wherein the resources of each co-existence frame for the first network is further determined based on QoS requirements for the detected access category.

20. The network element of claim 15 wherein the first and second network portions are determined based on an amount of the airtime share of the coordination period allocated to the first network portions of previous co-existence frames in the coordination period such that a sum of the first network portions over the coordination period approximates the airtime share.

* * * * *